United States Patent [19]

Kawada et al.

[11] Patent Number: 5,276,296
[45] Date of Patent: Jan. 4, 1994

[54] WELDING GUN APPARATUS

[75] Inventors: Masaki Kawada; Keizaburo Ohtaki, both of Sayama, Japan

[73] Assignee: Honda Giken Kogyo Kabushiki Kaisha, Tokyo, Japan

[21] Appl. No.: 843,430

[22] Filed: Feb. 28, 1992

[30] Foreign Application Priority Data

| Mar. 22, 1991 | [JP] | Japan | 3-058579 |
| Mar. 22, 1991 | [JP] | Japan | 3-058580 |
| Mar. 22, 1991 | [JP] | Japan | 3-058582 |
| Mar. 22, 1991 | [JP] | Japan | 3-058583 |
| Mar. 22, 1991 | [JP] | Japan | 3-058584 |
| Mar. 22, 1991 | [JP] | Japan | 3-058585 |

[51] Int. Cl.$^5$ ............................................. B23K 11/24
[52] U.S. Cl. ....................................... 219/116; 219/108
[58] Field of Search ......................... 219/108, 110, 116

[56] References Cited

U.S. PATENT DOCUMENTS

| 3,820,437 | 6/1974 | Dyer et al. | |
| 4,485,289 | 11/1984 | Schwartz | 219/116 |
| 4,559,438 | 12/1985 | Nakadate et al. | 219/116 |
| 4,842,456 | 6/1989 | Saito | |
| 5,023,423 | 6/1991 | Tsujii et al. | 219/116 |
| 5,053,599 | 10/1991 | Tsujii et al. | 219/116 |
| 5,077,458 | 12/1991 | Takano et al. | 219/116 |

FOREIGN PATENT DOCUMENTS

| 60-141977 | 9/1985 | Japan . |
| 2-108582 | 8/1990 | Japan . |
| 2225972 | 6/1990 | United Kingdom . |
| WO84/00638 | 2/1984 | World Int. Prop. O. . |

Primary Examiner—Clifford C. Shaw
Attorney, Agent, or Firm—Armstrong, Westerman, Hattori, McLeland & Naughton

[57] ABSTRACT

In a DC type C-shaped welding gun apparatus having a transformer mounted thereon, a center tap of the transformer is communicated to a movable gun arm via an ounce metal plate. A rear end portion of a stationary gun arm is pressingly held between a pair of terminal plates via rectifiers. Both terminal plates are disposed such that their center line is offset to one widthwise side of the transformer. The stationary gun arm is thus disposed to one widthwise side of a projected area of the transformer. The ounce metal plate for supplying electric power to the movable gun arm is disposed to the other side of the projected area. In an X-shaped welding gun apparatus, a first gun arm is rotatably supported by a supporting shaft provided on a gun bracket. A second gun arm is directly connected to one of feeder terminals of a transformer to constitute the second gun arm and the transformer into a unit. This unit is rotatably supported by the supporting shaft via a supporting arm, and the other of the feeder terminals is connected to the first gun arm via the supporting arm. The supporting arm is used as a feeder member. The feeder member can thus be disposed within the width of the gun bracket. A pressurizing cylinder is supported on the supporting arm along the transformer. The vacant space around the transformer is utilized as a space for disposing the cylinder to thereby minimize the size of the welding gun.

13 Claims, 14 Drawing Sheets

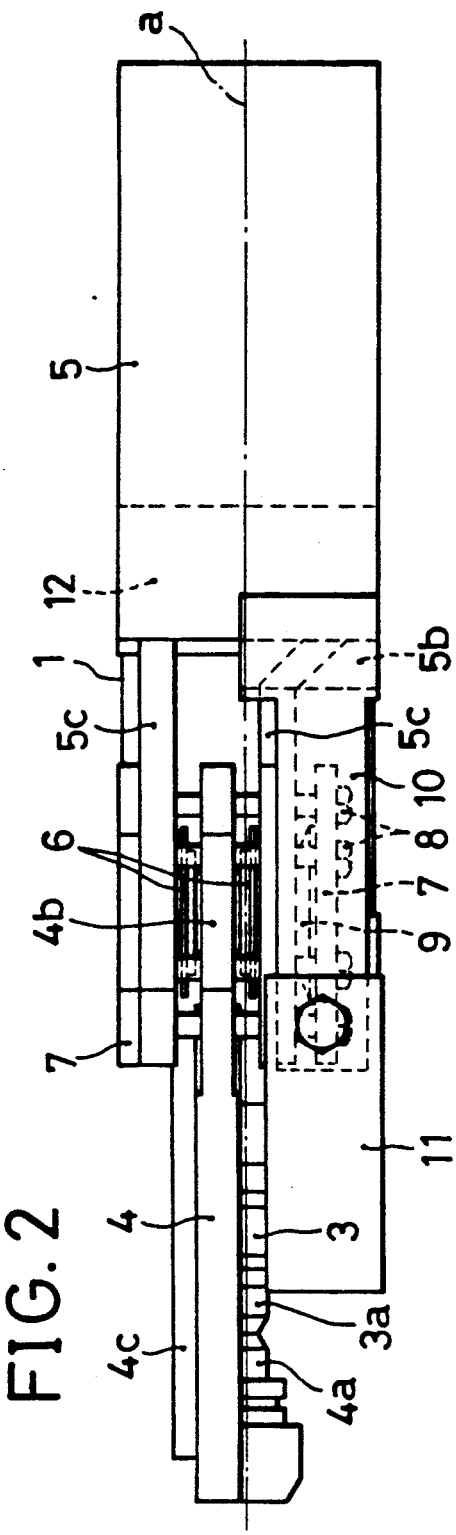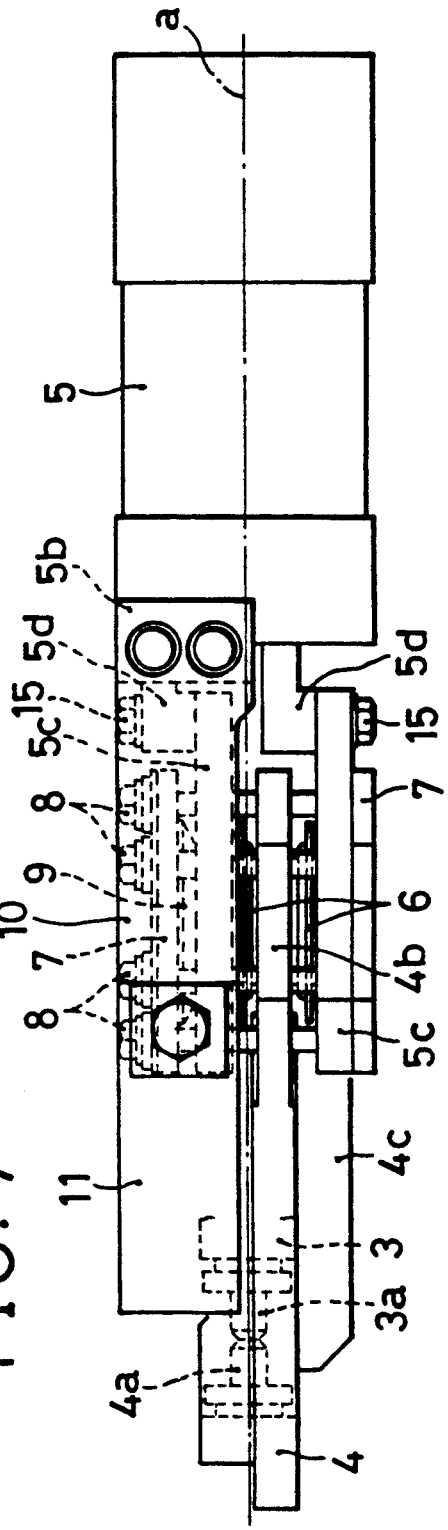

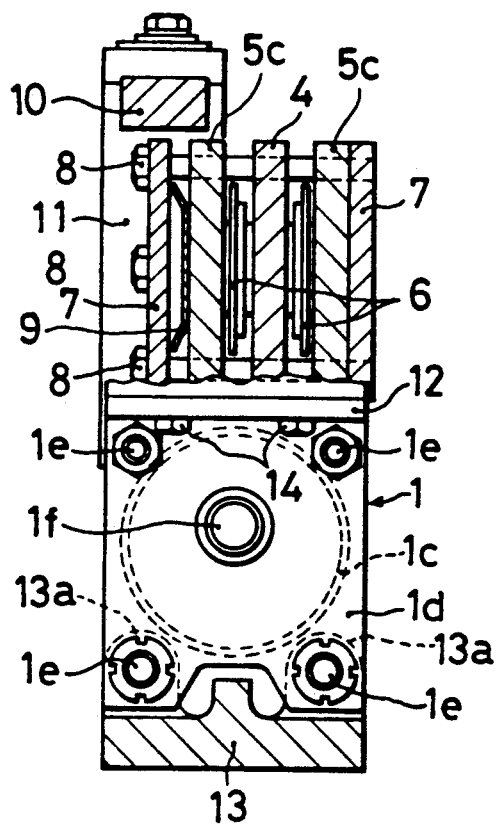
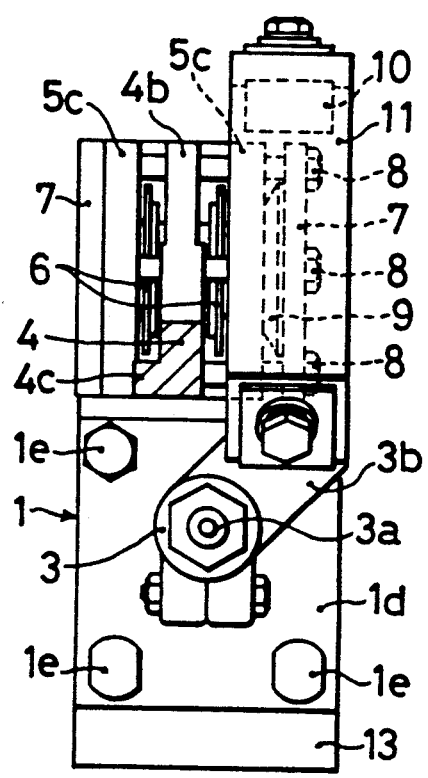
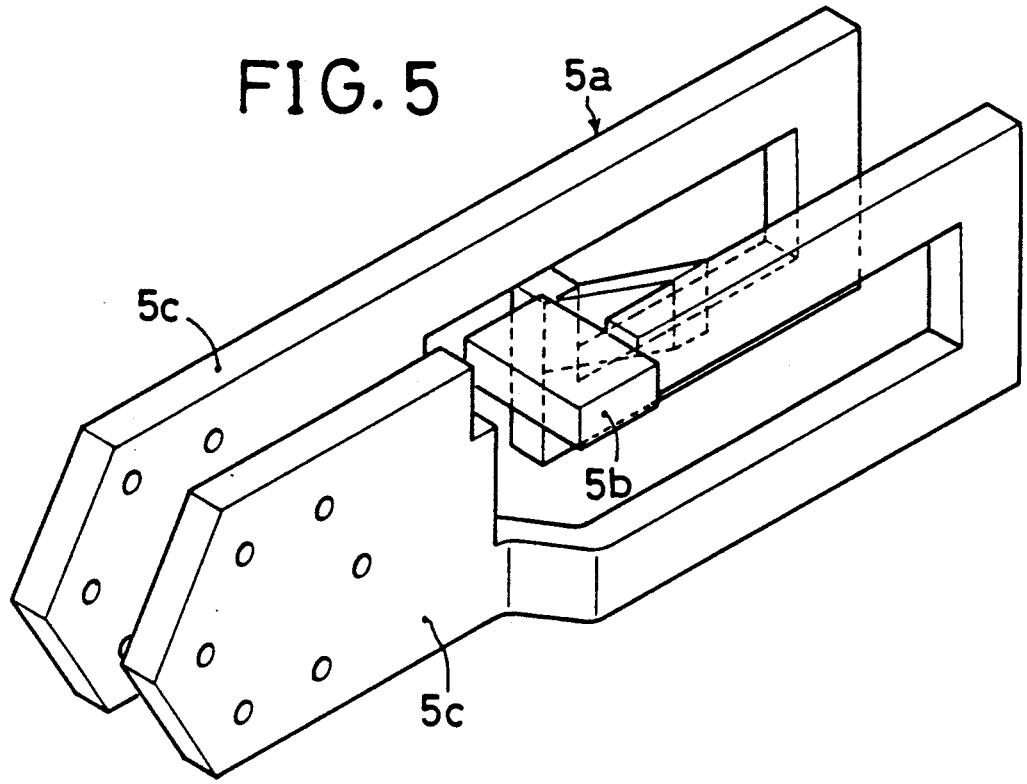

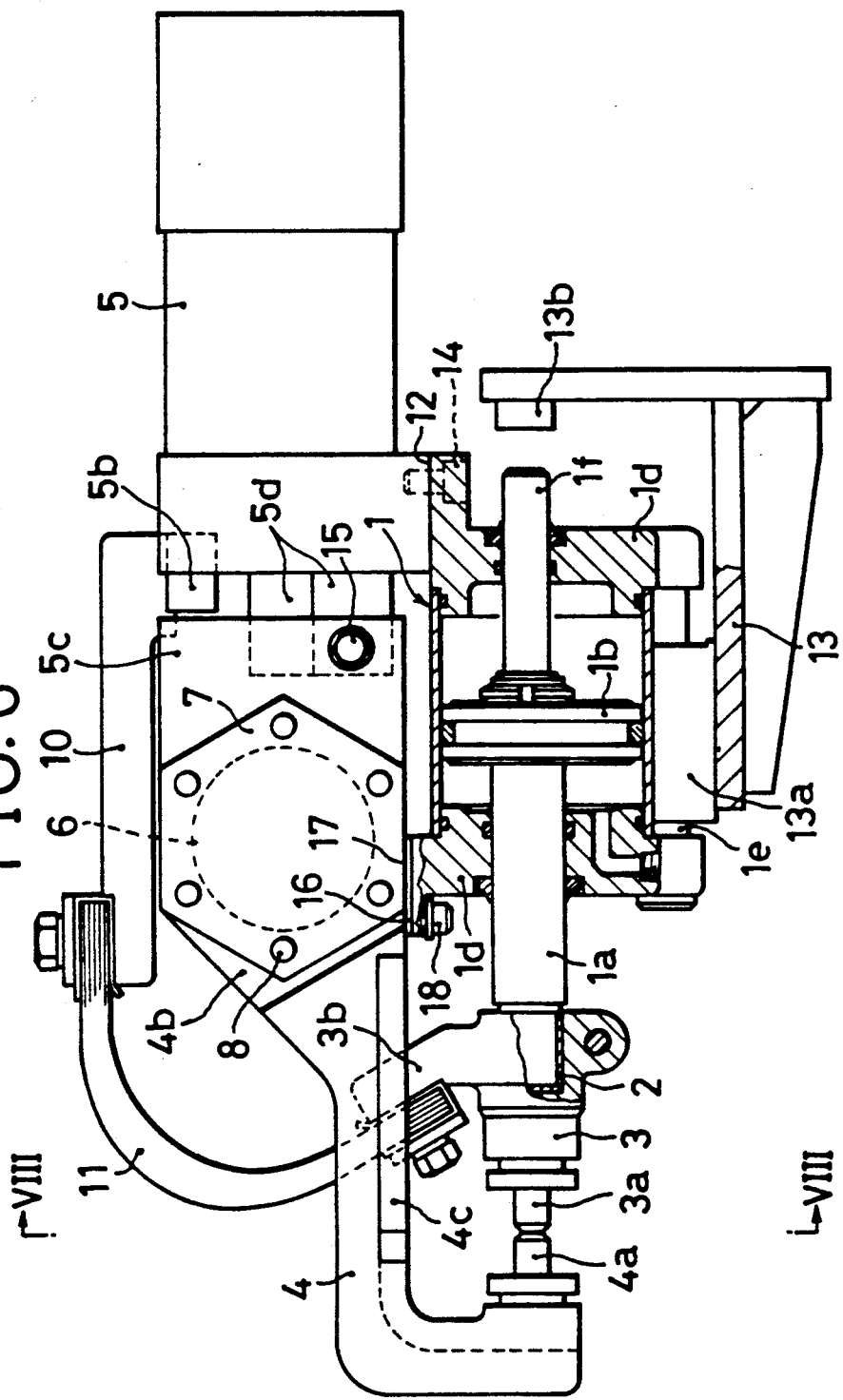

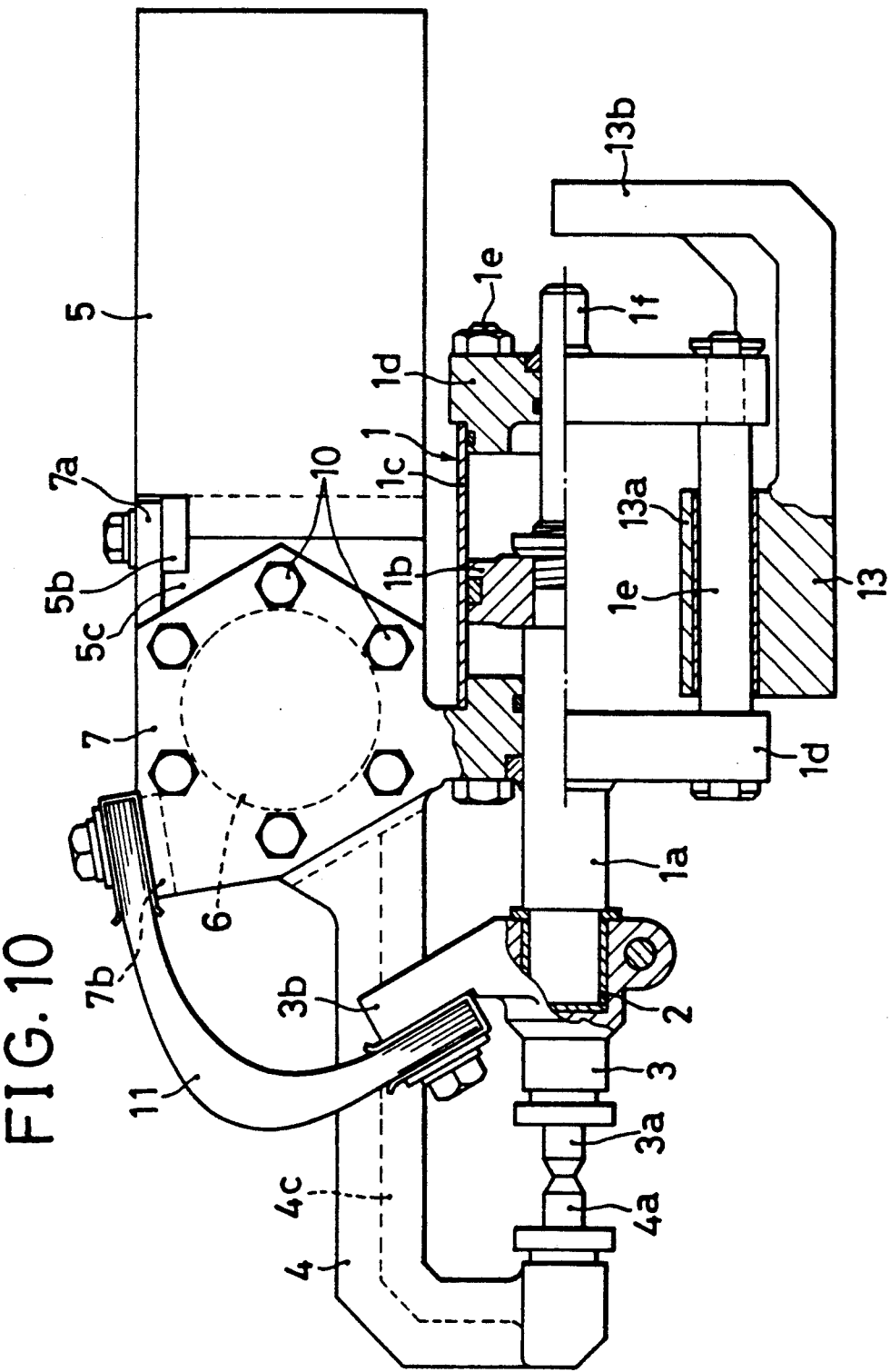

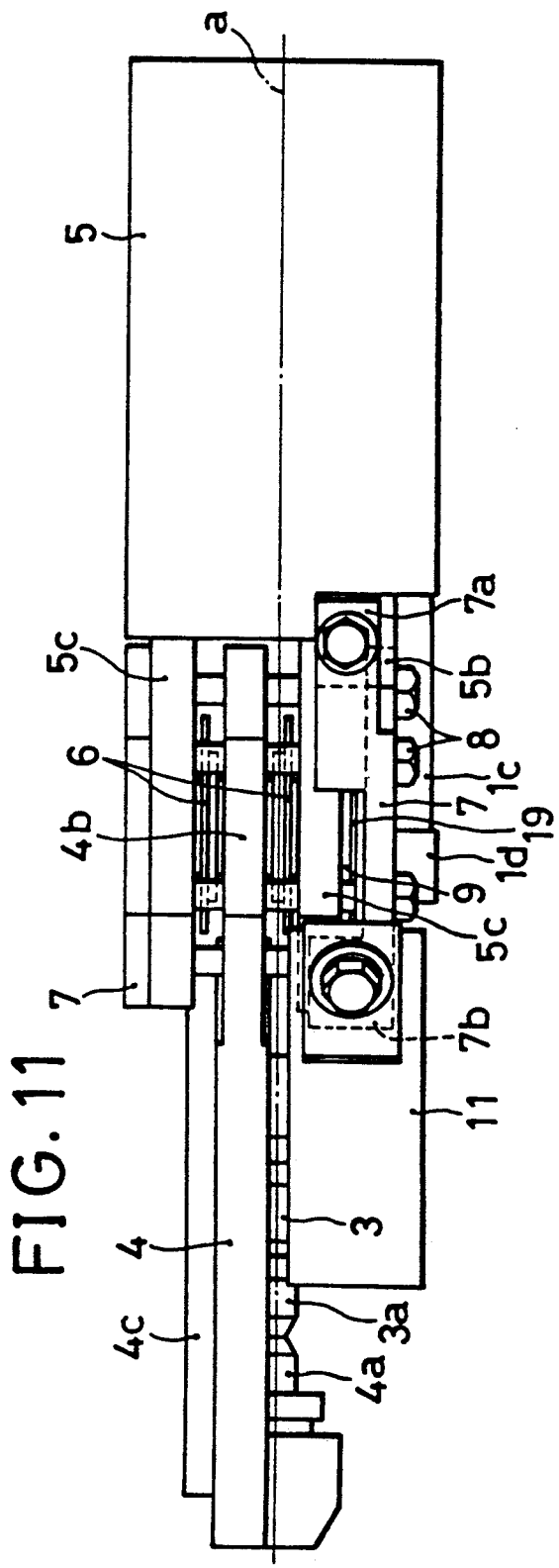

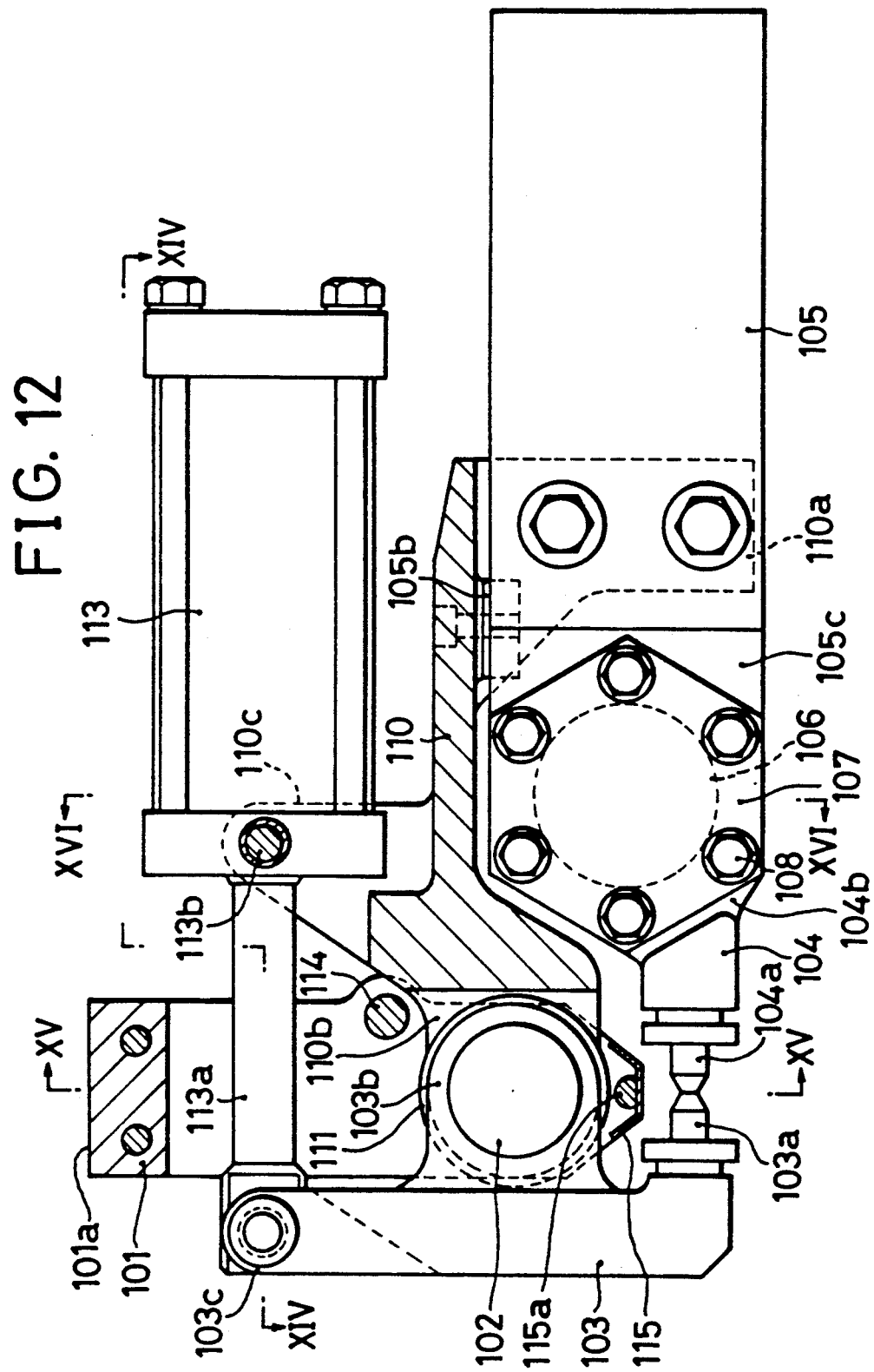

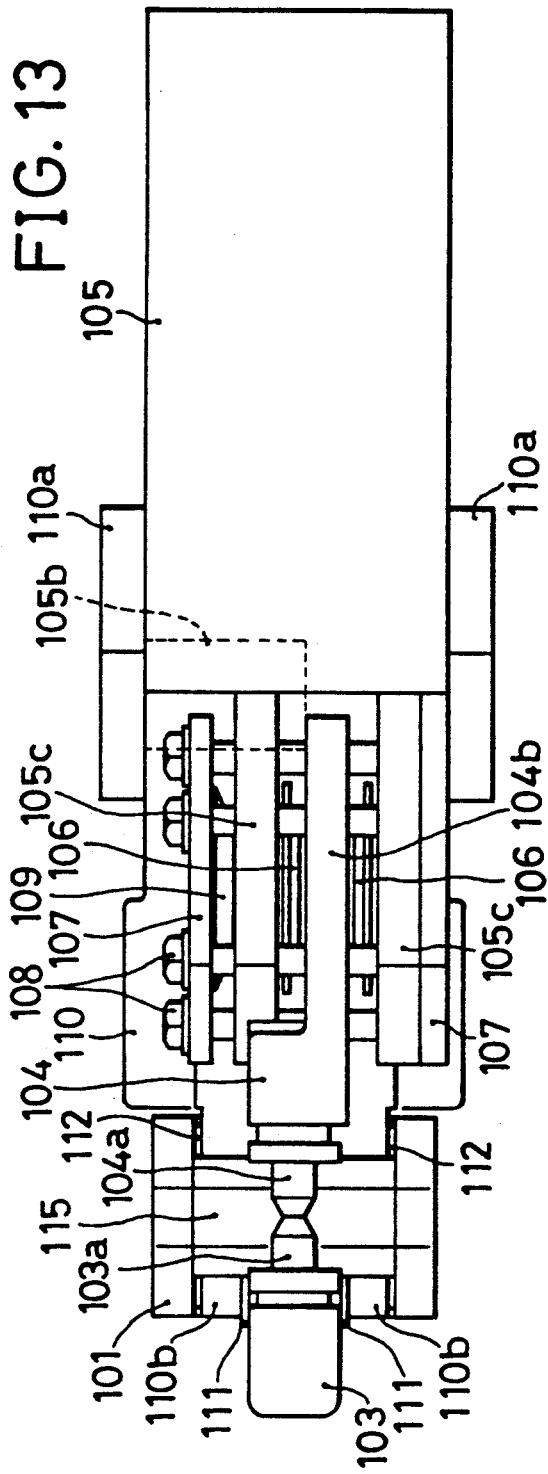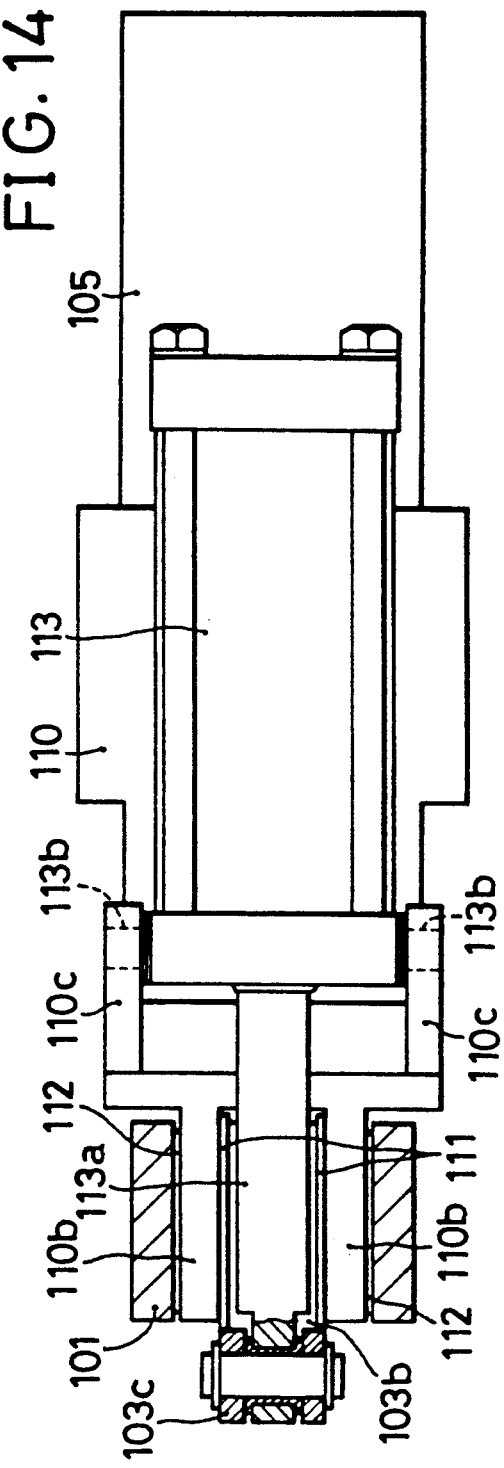

WELDING GUN APPARATUS

BACKGROUND OF THE INVENTION

This invention relates to a C-shaped or X-shaped welding gun apparatus having mounted thereon a transformer.

The welding gun apparatus can largely be divided into two kinds; one is the C-shaped welding gun apparatus and the other is the X-shaped welding gun apparatus.

The C-shaped welding gun apparatus generally comprises a gun bracket, a pressurizing cylinder which is slidably supported on the gun bracket, a movable gun arm which is mounted on a piston rod which extends forwards from the pressurizing cylinder, a stationary gun arm which extends from the side of the pressurizing cylinder towards a front of the movable gun arm so as to lie opposite to a front portion of the movable gun arm, and a transformer which is provided on a rear side of the stationary gun arm.

In this kind of C-shaped welding gun apparatus, the following construction is disclosed in the Japanese Published Unexamined Utility Model Application No. 108582/1990. Namely, the construction is characterized in: that a center tap of a secondary coil of a transformer is connected to a movable gun arm through a feeder relay member and a copper-base alloy plate called an ounce metal plate; that a rear end portion of a stationary gun arm is inserted into a pair of terminal plates with a rectifier interposed between the rear end portion and each of the terminal plates, the terminal plates being connected to both ends of the secondary coil of the transformer and being oppositely disposed in the widthwise direction of the transformer; that both terminal plates are pressingly held or sandwiched between a pair of holding plates which are provided on oppositely external sides of both terminal plates, by means of tightening bolts which extend across the holding plates; and that the rear end portion of the stationary gun arm is thus fixedly pressed between both terminal plates with the rectifiers interposed therebetween so that the stationary gun arm is supplied with electric power directly from the rectifiers. In this construction, the above-mentioned terminal plates are symmetrically disposed on both sides of the widthwise center line of the transformer. The stationary gun arm is arranged to extend from between both terminal plates forwards along the center line of the transformer. On one side of the stationary gun arm the above-mentioned ounce metal plate is disposed so as not to contact the stationary gun arm.

The X-shaped welding gun apparatus generally comprises a gun bracket, a pair of gun arms which are rotatably supported by a common supporting shaft which is provided on the gun bracket, and a pressurizing cylinder for opening and closing both gun arms. In case the X-shaped welding gun apparatus is to be equipped with a transformer, the construction in general is that the transformer is supported on the gun bracket, and that one of the feeder terminals and the other of the feeder terminals of the transformer are respectively connected to one of the gun arms and the other thereof via respective ounce metal plates. In this apparatus, there is a disadvantage in that a space is required for laying out the ounce metal plates in a roundabout manner, thereby making the apparatus large in size. In order to eliminate this disadvantage, the following construction is also disclosed in the Japanese Published Unexamined Patent Application No. 99489/1985. Namely, the construction is characterized in: that a bush which is electrically insulated from a supporting shaft is externally fit into the supporting shaft; that one of the gun arms is directly and rotatably supported by the supporting shaft and the other of the gun arms is rotatably supported by the supporting shaft via the bush; that a pair of feeder terminals of the transformer are electrically connected respectively to the supporting shaft and the bush via a respective feeder bar so that electric power is supplied to one of the gun arms via the supporting shaft and to the other of the gun arms via the bush.

In the above-mentioned conventional C-shaped welding gun apparatus, the stationary gun arm is disposed in the widthwise center of a front projected area of the transformer. As a result, the ounce metal plate to be disposed on one side of the stationary gun arm protrudes outside the above-mentioned projected area and, therefore, the width of the welding gun becomes large. This brings about a disadvantage in that this large width becomes a hindrance in inserting the welding gun into a widthwise narrow dented portion to carry out the welding of a workpiece.

In addition, in the above-mentioned conventional X-shaped welding gun apparatus, there is provided on a shaft end side a connecting portion which includes contactors so that each of the feeder bars is connected via each of the contactors to the supporting shaft and to the bush, respectively. This connecting portion protrudes towards the side of the bracket, resulting in a large width of the welding gun. This large width becomes a hindrance to the welding in a narrow place like in the aobve-mentioned conventional C-shaped welding gun apparatus.

OBJECT AND SUMMARY OF THE INVENTION

In view of the above-mentioned disadvantages, it is an object of this invention to provide a compact welding gun apparatus whose width is made as small as possible.

In order to attain the above object, a C-shaped welding gun apparatus of this invention comprises: a gun bracket; a pressurizing cylinder which is slidably supported on the gun bracket; a movable gun arm which is mounted on a piston rod which extends forwards from the pressurizing cylinder; a stationary gun arm which extends from a side of the pressurizing cylinder towards a front of the movable gun arm so as to lie opposite to a front portion of the movable gun arm; and a transformer which is provided on a rear side of the stationary gun arm, wherein: a center tap of a secondary coil of the transformer is connected to the movable gun arm through an ounce metal plate; a rear end portion of the stationary gun arm is inserted into a pair of terminal plates with a rectifier interposed respectively between the rear end portion and each of the terminal plates, the terminal plates being connected to both ends of the secondary coil of the transformer and being oppositely disposed in a widthwise direction of the transformer; both of the terminal plates are disposed such that a center line thereof is offset to one side of a widthwise center of the transformer; the stationary gun arm is provided on one widthwise side of a front projected area of the transformer; and the ounce metal plate is provided, in parallel with the stationary gun arm, on the other side of the projected area.

An X-shaped welding gun apparatus of this invention comprises a gun bracket; a pair of gun arms which are opened and closed about a common supporting shaft which is provided in the gun bracket; and a transformer, wherein: one of the gun arms is directly connected to one of feeder terminals of the transformer to constitute a unit comprising the one of the gun arms and the transformer which are mechanically connected together; a supporting arm which supports the unit is provided to rotatably support the one of the gun arms on the supporting shaft via the supporting arm; and the other of the gun arms to be rotatably supported on the supporting shaft is electrically connected to the other of the feeder terminals of the transformer via the supporting arm.

According to the C-shaped welding gun arm apparatus of this invention, the stationary gun arm is disposed to offset to a widthwise one side of the projected area of the transformer. Therefore, the widthwise other side of the projected area becomes available as a vacant space for disposing therein the ounce metal plate. As a result, both the stationary gun arm and the ounce metal plate can be disposed in a space-efficient manner within the width of the projected area of the transformer.

In a conventional C-shaped welding gun apparatus, as shown in the Japanese Published Unexamined Utility Model Application No. 141977/1985 and in the Japanese Published Unexamined Utility Model Application No. 108582/1990, there are provided, on head covers on both ends of a pressurizing cylinder, supporting plates which extend sidewise, and guide bars are extended between both supporting plates so that the pressurizing cylinder can be slidably supported on the gun bracket via the guide bars. In this constitution, the supporting plates and the guide bars are required. Consequently, the sliding mechanism of the pressurizing cylinder becomes complicated, and also the supporting mechanism becomes large in size. Therefore, those effects of minimizing the size which are obtained by the offset layout of the stationary gun arm are largely reduced. In case the pressurizing cylinder is operated by a high-pressure fluid, it is desired to use a high-pressure type of cylinder whose head covers on both ends thereof are tightened by means of a plurality of tie rods which extend therebetween. Then, according to another aspect of the C-shaped welding gun apparatus of this invention, at least two pieces of a plurality of tie rods which are provided to extend between head covers on both ends of the pressurizing cylinder are inserted through guide sleeves which are formed in the gun bracket, whereby the pressurizing cylinder is slidably supported on the gun bracket via the tie rods. According to this arrangement, special members to constitute the sliding mechanism of the pressurizing cylinder become needless and, therefore, the sliding mechanism can be made smaller and simpler, thereby making the entire apparatus as small as possible.

The rectifiers for the welding gun are subjected to a high electric current and are therefore short in their lifetime. It necessitates frequent replacements of the rectifiers. In the above-mentioned conventional C-shaped welding gun apparatus, since the pair of terminal plates which pressingly hold the stationary gun arm via the rectifiers are integrally formed with the secondary coil of the transformer, it is necessary to carry out the replacement work of the rectifiers by removing the stationary gun arm together with the transformer. Therefore, whenever the rectifiers are replaced, it is necessary to remove the wiring to a primary coil of the transformer and to carry the stationary gun arm while a heavy item in the form of the transformer is attached thereto. This makes the replacement work troublesome.

In addition, in the above-mentioned conventional apparatus, the stationary gun arm is mounted on the pressurizing cylinder via a supporting bracket which is separate from the pressurizing cylinder. Therefore, the number of parts is increased and the cost becomes expensive.

According to another aspect of the C-shaped welding gun apparatus of this invention, both terminal plates are detachably mounted to taps on both ends of the secondary coil, and an arm fixture for detachably mounting thereto the stationary gun arm is integrally formed in a front head cover of the pressurizing cylinder, and a transformer fixture for detachably mounting thereto the transformer is integrally formed in a rear head cover of the pressurizing cylinder.

According to this constitution, when the rectifiers are replaced, it is possible to remove the stationary gun arm, the terminal plates, and the rectifiers as a unit while the transformer is fixed to the transformer fixture. The removal is made by separating both terminal plates from the taps on both sides of the secondary coil and by separating the stationary gun arm from the arm fixture. The replacement work thus becomes easier. In case the terminal plates are detachably mounted on the taps of the secondary coil, the mechanical strength of connection between the stationary gun arm and the transformer decreases. However, there is no problem because there are provided the fixture for the arm and the fixture for the transformer. In addition, since both fixtures are formed integrally with the head covers on both ends of the pressurizing cylinder, the number of parts does not increase, and the construction can be simplified. Furthermore, by disposing the stationary gun arm on one widthwise side of the projected area of the transformer, the stationary gun arm can be bolted to the arm fixture without being hindered by that piston rod of the pressurizing cylinder which is disposed to coincide with a widthwise center plane of the projected area of the transformer.

The above-mentioned ounce metal plate is generally connected to a rectilinear feeder relay member which is connected to the center tap of the secondary coil of the transformer. In case one of the holding plates which pressingly hold both terminal plates from oppositely external sides of both terminal plates is electrically insulated from the terminal plates, and the center tap and the ounce metal plate are electrically connected to the above-mentioned one of the holding plates so that the holding plate can be used to function also as the feeder relay member, a separate relay member becomes needless and the number of parts is reduced. In this case, if both holding plates are formed integrally with the head cover on the front end of the pressurizing cylinder, the number of parts can further be reduced.

According to the above-mentioned X-shaped welding gun apparatus of this invention, one of the gun arms is directly supplied with electric power from one of the feeder terminals of the transformer and the other of the gun arms is supplied with electric power from the other of the feeder terminals of the transformer through the supporting arm. Here, since the other gun arm and the supporting arm are rotatably supported by the common supporting shaft within the width of the gun bracket, the feeder member does not protrude sidewise of the gun bracket. Therefore, the width of the welding gun can be reduced.

The above-mentioned one gun arm is rotatably supported by the supporting shaft together with the transformer via the supporting arm. If the pressurizing cylinder is supported by either one of the supporting arm and the other of the gun arms, and the piston rod of the pressurizing cylinder is connected to the other of the two, i.e., the supporting arm and the other of the gun arms, both of the gun arms can be opened and closed by the operation of the pressurizing cylinder. In this case, if the pressurizing cylinder is supported by the supporting arm substantially in parallel with the transformer, the space in the neighborhood of disposing the transformer inclusive of the connecting portion of one of the gun arms, can be effectively utilized for disposing the pressurizing cylinder. The whole apparatus can thus be made smaller.

In case all wave rectified DC current is supplied through both gun arms, the other of the feeder terminals of the transformer is constituted by the center tap of the secondary coil. The above-mentioned one of the feeder terminals is constituted by a pair of terminal plates which are connected to both ends of the secondary coil and are disposed in opposite relationship to each other. The above-mentioned one of the gun arms is pressingly held between both terminal plates in such a condition that a rectifier is interposed respectively between the gun arm and each of the terminal plates. As a consequence, one of the gun arms and the transformer can be connected to each other with a sufficient mechanical strength without giving rise to an electric supply loss.

In this case, a pair of holding plates for pressingly holding the both terminal plates from oppositely external sides of the terminal plates are provided. If the supporting arm and the holding plates are formed integrally, the number of parts can be reduced.

In addition, a double-headed X-shaped welding gun apparatus is known in which: a pair of first and second gun arms are rotatably supported on a supporting shaft which is provided in a gun bracket; a pair of electrodes are provided at a front end portion of the first gun arm in opposite directions; a two-piece-branched pair of arm portions are formed in the second gun arm; an electrode which faces one of the the electrodes of the first gun arm is mounted on one of the arm portions; and an electrode which faces the other of the electrodes of the first gun arm is mounted on the other of the arm portions. Even in this type of apparatus, the welding gun apparatus can be made in a compact manner by the following arrangement. Namely, a supporting arm which is rotatably supported by the supporting shaft is provided. The transformer is supported by the supporting arm. One of the gun arms is directly connected to one of feeder terminals of the transformer. The other of the feeder terminals of the transformer is electrically connected to the other of the gun arms via the supporting arm.

BRIEF DESCRIPTION OF THE DRAWINGS

The above and other objects and the attendant advantages of this invention will become readily apparent by reference to the following detailed description when considered in conjunction with the accompanying drawings wherein:

FIG. 2 is a plan view thereof;

FIG. 3 is a sectional view taken along the line III—III in FIG. 1;

FIG. 4 is a sectional view taken along the line IV—IV in FIG. 1;

FIG. 5 is a perspective view of a secondary coil of a transformer therefor;

FIG. 6 is a side view, partly shown in section, of a second embodiment of the C-shaped welding gun apparatus of this invention;

FIG. 7 is a plan view thereof;

FIG. 10 is a side view, partly shown in section, of a third embodiment of the C-shaped welding gun apparatus of this invention;

FIG. 11 is a plan view thereof;

FIG. 12 is a side view, partly shown in section, of a first embodiment of an X-shaped welding gun apparatus of this invention;

FIG. 13 is a bottom view thereof;

FIG. 14 is a sectional view taken along the line XIV—XIV in FIG. 12;

DETAILED DESCRIPTION OF A PREFERRED EMBODIMENT

Figure 1:
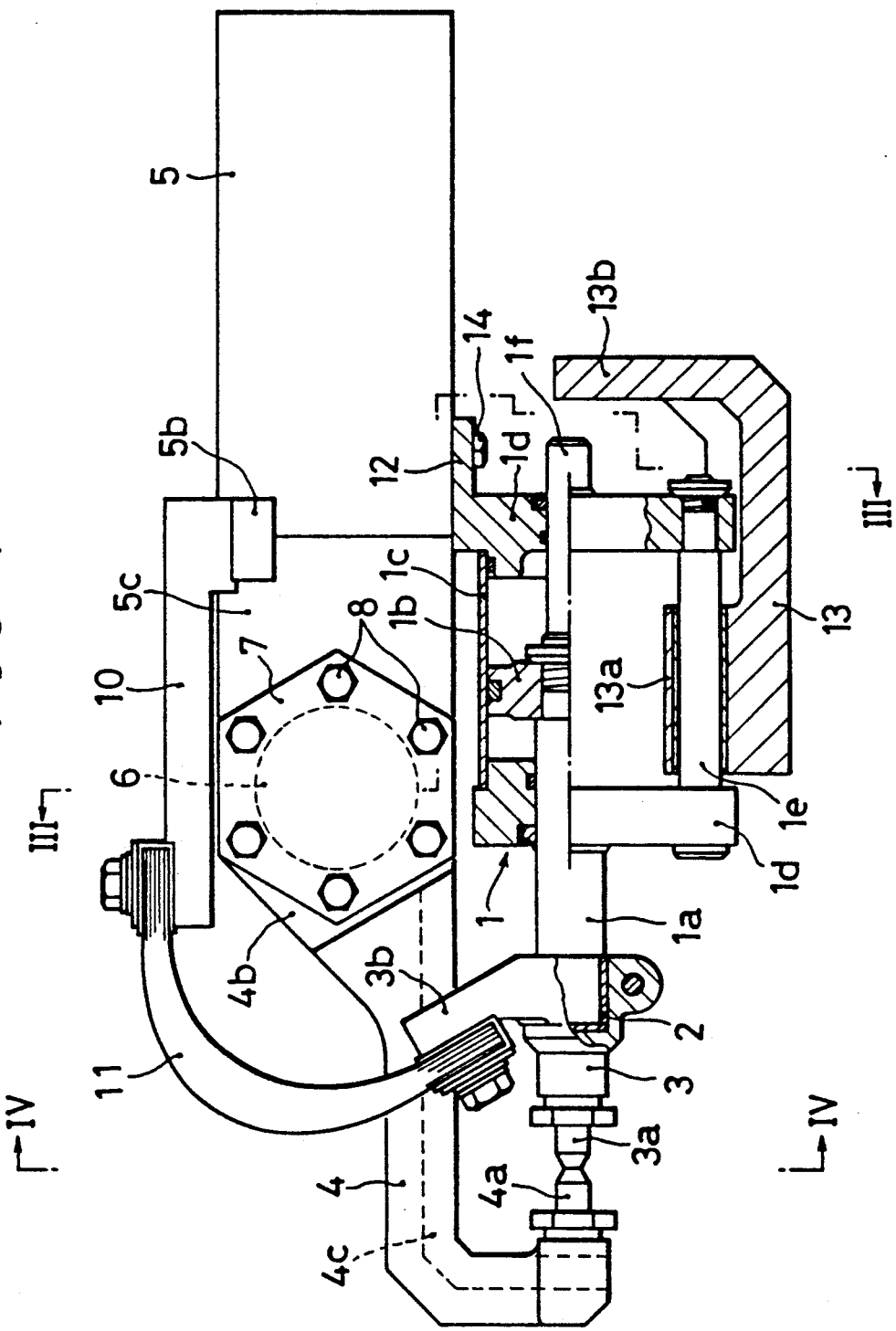
FIG. 1 is a side view, partly shown in section, of a first embodiment of a C-shaped welding gun apparatus of this invention.
Figure 8:
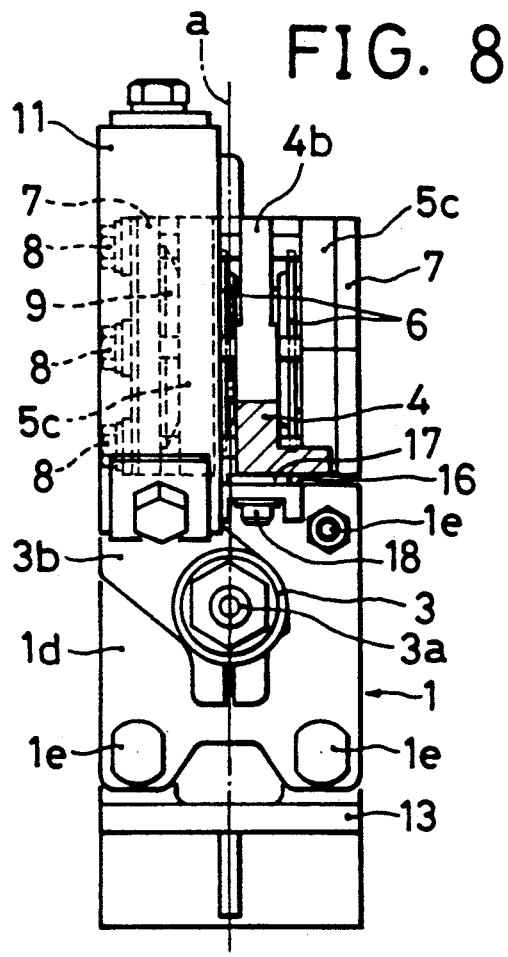
FIG. 8 is a sectional view taken along the line VIII—VIII in FIG. 6.
Figure 9:
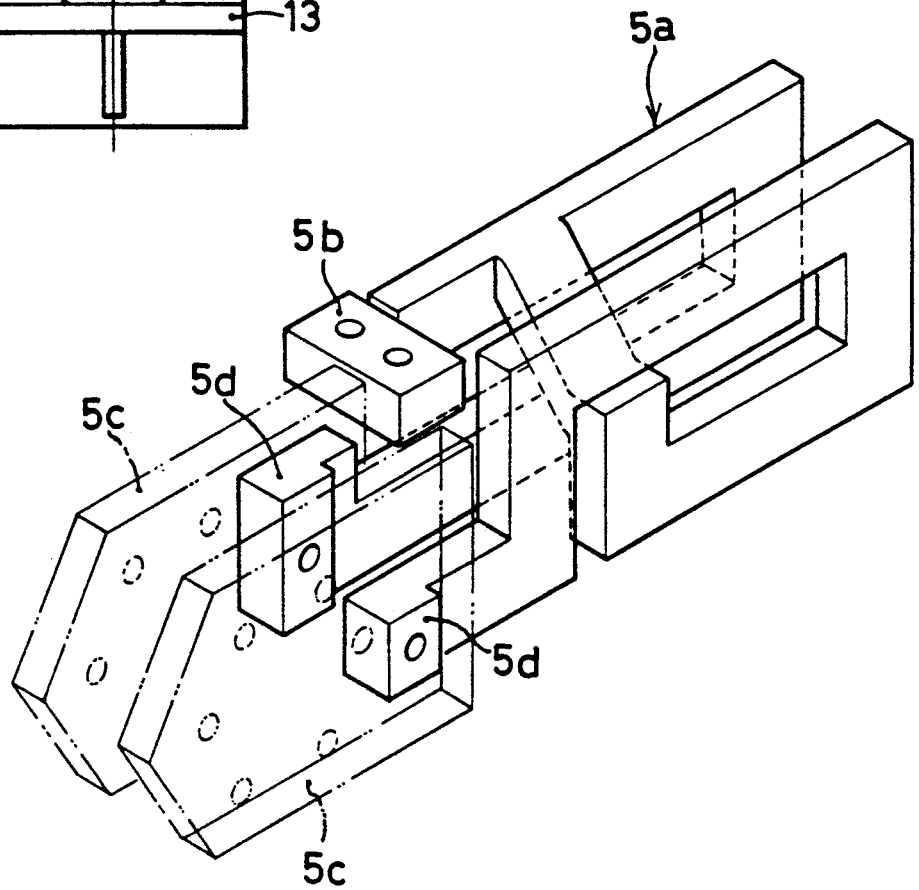
FIG. 9 is a perspective view of a secondary coil of a transformer therefor.

Referring to FIG. 1, a C-shaped welding gun apparatus is constituted by a pressurizing cylinder 1, a movable gun arm 3 which is mounted, via an electrically insulating material 2, on a piston rod 1a which projects forwards from the pressurizing cylinder 1, a stationary gun arm 4 which is provided above the pressurizing cylinder 1 and extends to a front of the movable gun arm 3 so as to lie opposite to a front tip portion of the movable gun arm 3. A workpiece is welded while it is held between electrodes 3a, 4a which are provided on opposing end faces of both gun arms 3, 4.

At a rear end of the stationary gun arm 4, there is provided a transformer 5. As shown in FIG. 5, a secondary coil 5a of the transformer 5 has integrally formed therewith a center tap 5b and terminal plates 5c, 5c which oppose each other in the widthwise direction of the transformer 5 and are connected to both ends of the secondary coil 5a. As shown in FIGS. 1 and 2, this center tap 5b and these terminal plates 5c, 5c are arranged to project out of the front face of the transformer 5. A rear end portion 4b, which is formed into a plate shape, of the stationary gun arm 4 is inserted, as shown in FIGS. 2 and 3, into a space between the terminal plates 5c, 5c with a rectifier 6 being interposed between the rear end portion 4b and each of the terminal plates 5c, 5c, respectively. Both terminal plates 5c, 5c are pressingly pinched or held by a pair of holding plates 7, 7 which are provided on oppositely external sides of the terminal plates 5c, 5c via a coned disc spring 9, by means of tightening bolts 8. The stationary gun arm 4 is thus fixed in a pressed manner between both terminal plates 5c, 5c with the rectifiers 6, 6 interposed therebetween. The center tap 5b is connected, via a feeder relay member 10 which extends forwards and an ounce metal plate 11, to a terminal portion 3b which projects to a place obliquely upwards of the movable gun arm 3, as shown in FIG. 4. It is thus so arranged that a DC electric current which is full wave rectified by the above-mentioned pair of rectifiers 6, 6 is caused to flow through the movable gun arm 3 and the stationary gun arm 4, thereby spot-welding a workpiece to be held between the electrodes 3a, 4a of both gun arms 3, 4.

The pressurizing cylinder 1 comprises a cylinder barrel 1c which contains therein an internally fit piston 1b, head covers 1d, 1d on both ends of the cylinder barrel 1c, and a plurality of tie rods 1e which are disposed to extend between the head covers 1d, 1d. The transformer 5 is fixed with bolts 14 to a transformer fixture 12 which is integrally formed on the rear-side head cover 1d, and the stationary gun arm 4 is supported on the cylinder 1 via the transformer 5.

Both terminal plates 5c, 5c are disposed such that the center line between both terminal plates 5c, 5c is offset to one side of the widthwise center line of the transformer 5. On one side of the widthwise center line "a" of the front projected area of the transformer 5, the stationary gun arm 4 is arranged to lie, and on the other side thereof the ounce metal plate 11 is arranged to lie in parallel to the stationary gun arm 4 so that both of the stationary gun arm 4 and the ounce metal plate 11 can be disposed within the width of the front projected area. The stationary gun arm 4 is reinforced by a rib 4c which is formed on an external side opposite the ounce metal plate 11. The front end portion of the stationary gun arm 4 is laid out to go around so as to lie opposite to the front end portion of the movable gun arm 3.

The pressurizing cylinder 1 is slidably supported on a gun bracket 13 which is provided on an operating end of a moving mechanism such as a robot. In this embodiment, in order to simplify and minimize a guide mechanism, the pressurizing cylinder 1 is slidably supported by a pair of tie rods 1e, 1e at a lower end of the pressurizing cylinder 1 so that the tie rods 1e, 1e are slidably supported by a pair of guide sleeves 13a, 13a which are formed in the gun bracket 13. The entire welding gun apparatus inclusive of the pressurizing cylinder 1 and the gun bracket 13 is thus arranged to be contained within the width of the transformer 5.

In addition, the piston rod 1a is integrally provided with a rod portion 1f which projects backwards of the pressurizing cylinder 1. A stopper portion 13b which lies opposite to the rod portion 1f is integrally formed on the gun bracket 13. In the retreating movement of the piston rod 1a when the guns are opened, the rod portion 1f abuts the stopper portion 13b when the movable gun arm 3 has been opened to a predetermined opening degree. Thereafter, the pressurizing cylinder 1 advances relative to the gun bracket 13 due to the reactive force of abutment, thereby opening the stationary gun arm 4 forwards to give a so-called equalizing movement.

FIGS. 6 through 9 show a second embodiment of the C-shaped welding gun apparatus of this invention. The same numerals as the above-mentioned first embodiment are given to the same members. The main difference between this embodiment and the first embodiment is that the terminal plates 5c, 5c are formed independent of the secondary coil 5 and that the terminal plates 5c, 5c are detachably fixed to the taps 5d, 5d on both ends of the secondary coil 5 by means of bolts 15.

In this second embodiment, the strength of mechanical connection between the stationary gun arm 4 and the transformer 5 is decreased. Consequently, the supporting rigidity of the stationary gun arm 4 will be insufficient if the transformer 5 is only fixed to the fixture 12 which is formed on the head cover 1d at the rear end of the pressurizing cylinder 1. Therefore, a fixture 16 for the gun arm 4 is integrally formed on the head cover 1d at the front end of the pressurizing cylinder 1 so that the stationary gun arm 4 can be fixed with bolts 18, via an electrically insulating material 17, to the fixture 16 at the lower surface of the rear end portion 4b.

In almost the same manner as in the first embodiment, the stationary gun arm 4 is offset to one side of the widthwise center line "a" of the front projected area of the transformer 5. The stationary gun arm 4 can, therefore, be bolted to the fixture 16 without being much hindered by the piston rod 1a which is located right below the center line "a".

By detachably mounting the terminal plates 5c, 5c to the taps 5d, 5d, it becomes possible to handle, as a unit, the terminal plates 5c, 5c, the rectifiers 6, 6 and the stationary gun arm 4 while they are pressingly held between the holding plates 7, 7. Therefore, when the lifetime of the rectifiers 6, 6 is over, the rectifiers 6, 6 can be replaced as a unit by releasing the fixing between the terminal plates 5c, 5c and the taps 5b, 5b as well as the fixing between the stationary gun arm 4 and the arm fixture 16. Normally, the rectifiers 6, 6 must securely be made to contact face to face with the respective opposing surfaces of the rear portion 4b of the stationary gun arm 4, and of the terminal plates 5c, 5c. It is therefore required to make precise adjustments in tightening the plurality of tightening bolts 8 for the holding plates 7, 7 at an equal tightening torque, resulting in a time-consuming work. If, however, a unit whose tightening adjustments have already been completed is prepared in advance, the time required for replacement of the unit can be shortened by replacing them on a unit by unit basis.

In the above-mentioned first and the second embodiments, the center tap 5b of the secondary coil 5a is connected to the ounce metal plate 11 via the feeder relay member 10. It is also possible, as shown in FIGS. 10 and 11, to cause one of the pair of holding plates 7, 7 serve as the feeder relay member to reduce the number of parts by eliminating the necessity of a separately provided relay member 10. In other words, in this embodiment, one of the holding plates 7 is connected to the center tap 5b at a terminal portion 7a which extends in the rear upper portion of the holding plate 7, and the ounce metal plate 11 is connected to a terminal portion 7b which is formed on an upper front end of the holding plate 7. The holding plate 7 is electrically insulated by an insulating plate 19 relative to the terminal plate 5c. In addition, in this embodiment, both holding plates 7, 7 are formed integrally with the front head cover 1d so that the stationary gun arm 4 and the transformer 5 are supported by the pressurizing cylinder 1 via both holding plates 7, 7.

The foregoing has been the explanations about the C-shaped welding gun apparatus, and the following are explanations about embodiments of the X-shaped welding gun apparatus of this invention.

Figure 15:
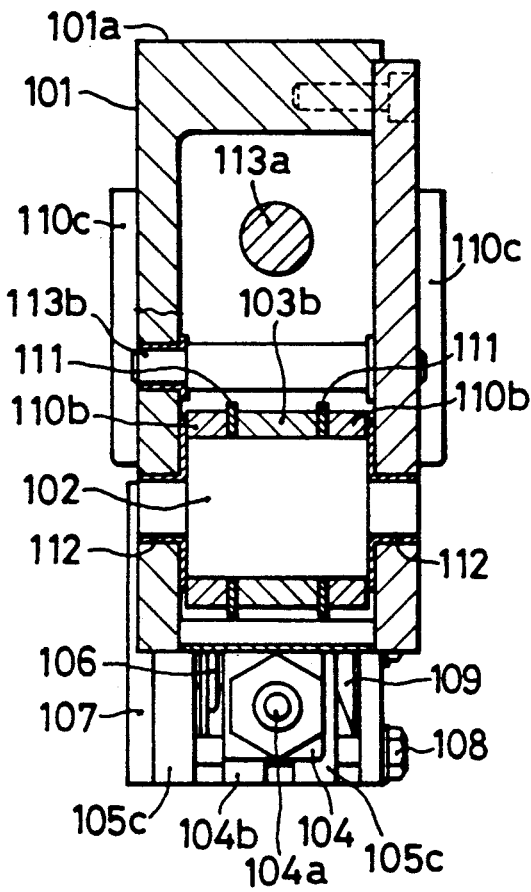
FIG. 15 is a sectional view taken along the line XV—XV in FIG. 12.

Referring to FIGS. 12 through 17, numeral 101 denotes a gun bracket which has on its upper end a mounting base portion 101a for mounting the gun bracket 101 to an operating end of a moving mechanism such as a robot, etc. This bracket 101 is formed in a reversed U-shape as shown in FIG. 15. A supporting shaft 102 is laterally provided at a lower end of the bracket 101. A pair of gun arms 103, 104 which are opened and closed with the supporting shaft 102 working as a fulcrum is provided so that electrodes 103a, 104a which are provided on both gun arms 103, 104 lie opposite to each other under the supporting shaft 102.

Figure 16:
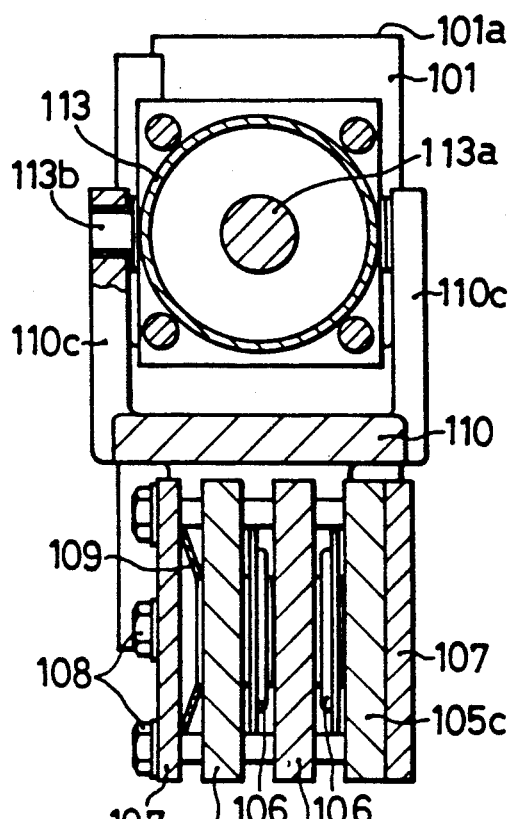
FIG. 16 is a sectional view taken along the line XVI—XVI in FIG. 12.
Figure 17:
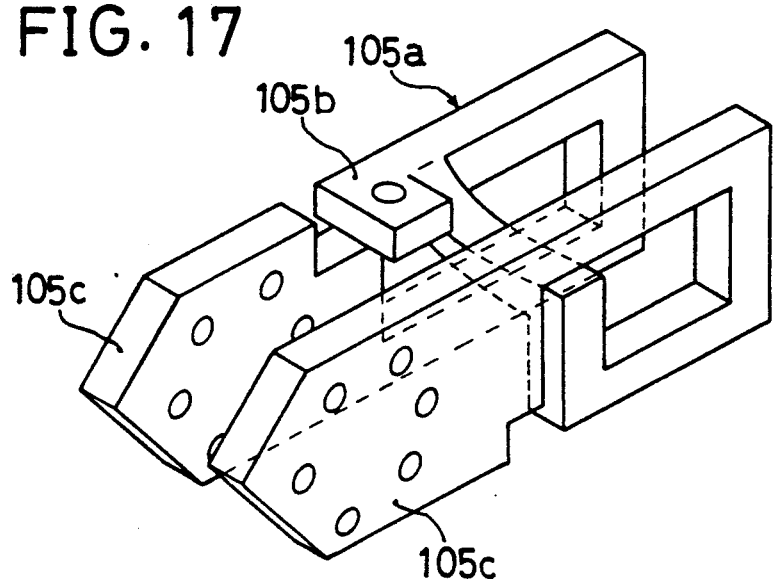
FIG. 17 is a perspective view of a secondary coil of a transformer of the apparatus in FIG. 12.

The front-side first gun arm 103 is directly rotatably supported by the supporting shaft 102 at a bearing block 103b which is formed in the gun arm 103, but the rear-side second gun arm 104 is rotatably supported by the supporting shaft 102 via the below-mentioned supporting arm 110 in such a condition that the second gun arm 14 is formed integrally with the transformer 105 which is provided behind the second gun arm 104. The relationship between the second gun arm 104 and the transformer 105 is the same as that between the stationary gun arm 4 and the transformer 5 in the above-mentioned C-shaped welding gun apparatus. In more detail, as shown in FIG. 17, a secondary coil 105a of the transformer 105 has integrally formed therewith a center tap 105b and a pair of terminal plates 105c, 105c which are connected to both ends of the secondary coil 105a and are laterally disposed in opposing relationship with each other. The center tap 105b and the terminal plates 105c, 105c are projected from the front surface of the transformer 105. That rear end portion 104b of the second gun arm 104 which is formed into a plate shape is inserted, as shown in FIGS. 13 and 16, into a space between both terminal plates 105c, 105c in such a condition that a rectifier 106 is interposed respectively between the rear end portion 104b and each of the terminal plates 105c. Both terminal plates 105c, 105c are pressingly held by a plurality of bolts 108 via a coned disc spring 109 between a pair of holding plates 107, 107 which are provided on oppositely external sides of the terminal plates 105c, 105c. The rear end portion 104b is thus pressingly fixed between the terminal plates 105c, 105c via the rectifiers 106, 106. In this manner, there is formed a unit comprising the second gun arm 104 and the transformer 105 which are mechanically connected together. This unit is rotatably supported by the supporting shaft 102 via the supporting arm 110 so that an opening and closing operation can be given to the second gun arm 104 about the supporting shaft 102.

The supporting arm 110 is intended to support the above-mentioned unit at the transformer 105. A front end portion of the transformer 105 is fixed by holding it between a pair of leg pieces 110a, 110a which are vertically provided at a rear end portion of the supporting arm 110. The supporting arm 110 is rotatably supported, as shown in FIGS. 14 and 15, by the supporting shaft 102 at forked bearing blocks 110b, 110b which are formed at a front end of the supporting arm 110 in such a manner that the bearing block 103b is sandwiched by the forked bearing blocks 110b. Further, the supporting arm 110 is connected to the center tap 105b at a rear lower portion of the supporting arm 110 so that the center tap 105b is electrically connected to the first gun arm 103 via the supporting arm 110 and the supporting shaft 102. In this embodiment, electrically insulating washers 111 are interposed between the bearing blocks 103b, 110b. However, the supporting arm 110 and the first gum arm 103 may be electrically directly connected to each other by deleting these washers 111. The supporting shaft 102 is electrically insulated relative to the gun bracket 101 via an insulating collar 112.

A pressurizing cylinder 113 is supported on the supporting arm 110 above and along the transformer 105. A piston rod 113a which projects forwards from the cylinder 113 is connected to a lever portion 103c at an upper end of the first gun arm 103 through an upper space in the gun bracket 101 so that the operation of the pressurizing cylinder 113 can give an opening and closing operation of the first and the second gun arms 103, 104. The pressurizing cylinder 113 is rotatably supported, as shown in FIG. 16, between projecting pieces 110c, 110c which are provided in a projecting manner at an upper end of the supporting arm 110, via pins 113b, 113b so that the pressurizing cylinder 113 can be inclined relative to the supporting arm 110 in accordance with the opening and closing operation of the gun arms 103, 104. However, the pressurizing cylinder 113 may also be fixedly secured to the supporting arm 110 so that the piston rod 113a is connected to the first gun arm 103 via a link.

The gun bracket 101 has therein a stopper pin 114 which is laterally provided above the supporting shaft 102. When the first and the second gun arms 103, 104 are opened, the first gun arm 103 and the supporting arm 110 abut the stopper pin 114 in such a manner that both sandwich the stopper pin 114. It is thus so arranged that both gun arms 103, 104 are restricted to a predetermined open position. Further, a cross bar 115a is laterally provided below the supporting shaft 102 of the gun bracket 101, and there is provided under the cross bar 115a a spatter cover 115 to prevent the welding spattering from adhering to the supporting shaft 102.

In welding a workpiece, the piston rod 113a of the pressurizing cylinder 13 is first advanced to close the first gun arm 113 and, at the same time, the second gun arm 104 is closed via the supporting arm 110, thereby pressingly holding the workpiece between the electrodes 103a, 104a of both gun arms 103, 104. Then, electric power is supplied to the transformer 105 to supply electric power to the second gun arm 104 from the terminal plates 105c, 105c which are one of the feeder terminals of the transformer 105 via the rectifiers 106, 106. The first gun arm 103 is simultaneously supplied with electric power from the center tap 105b which is the other of the feeder terminals via the supporting arm 110. The spot-welding of the workpiece is thus carried out by causing the DC current which is full wave rectified by the rectifiers 106, 106 to flow through the electrodes 103a, 104a.

Figure 18:
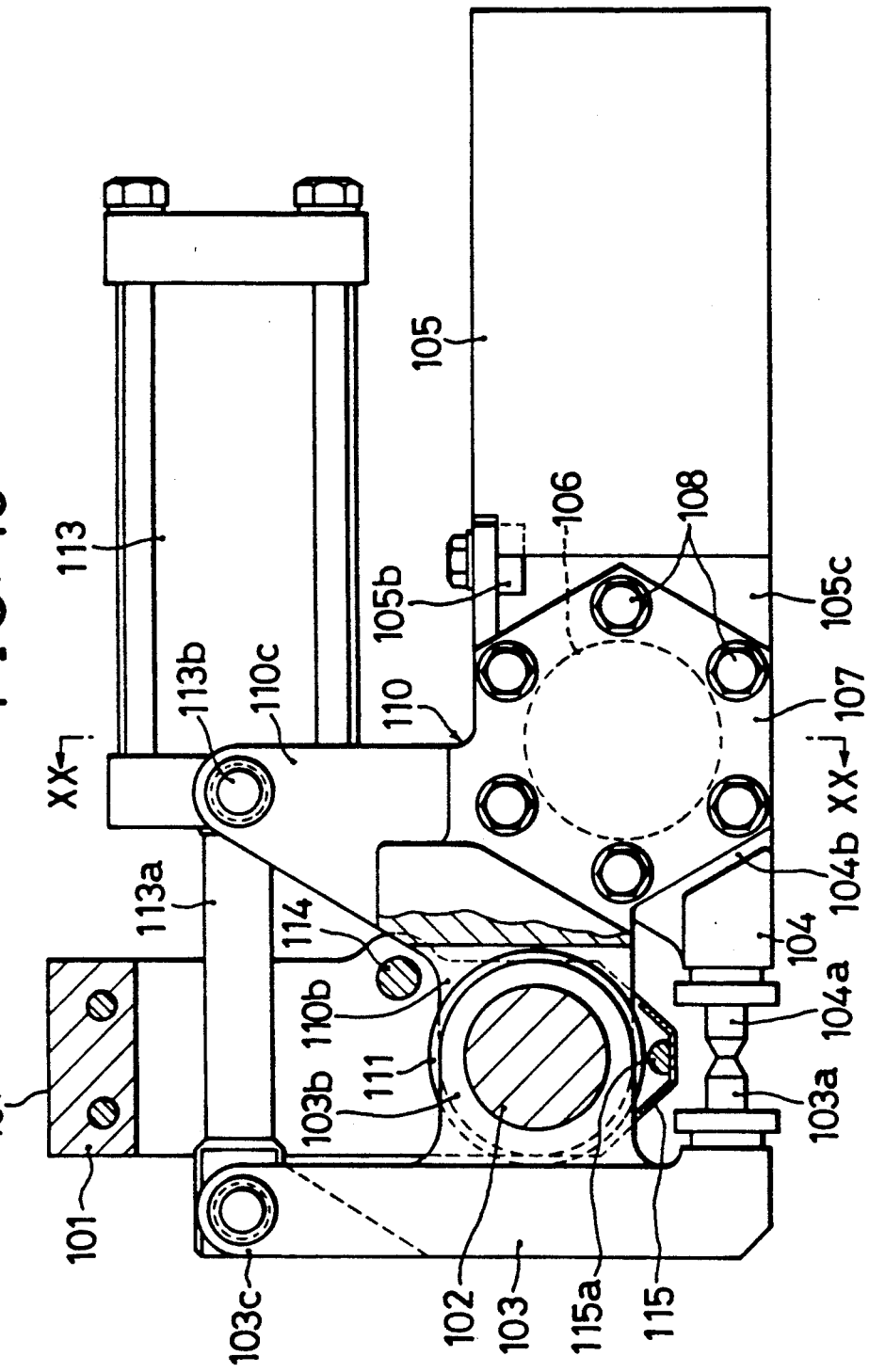
FIG. 18 is a side view, partly shown in section, of a second embodiment of the X-shaped welding gun apparatus of this invention.
Figures 19, 23:
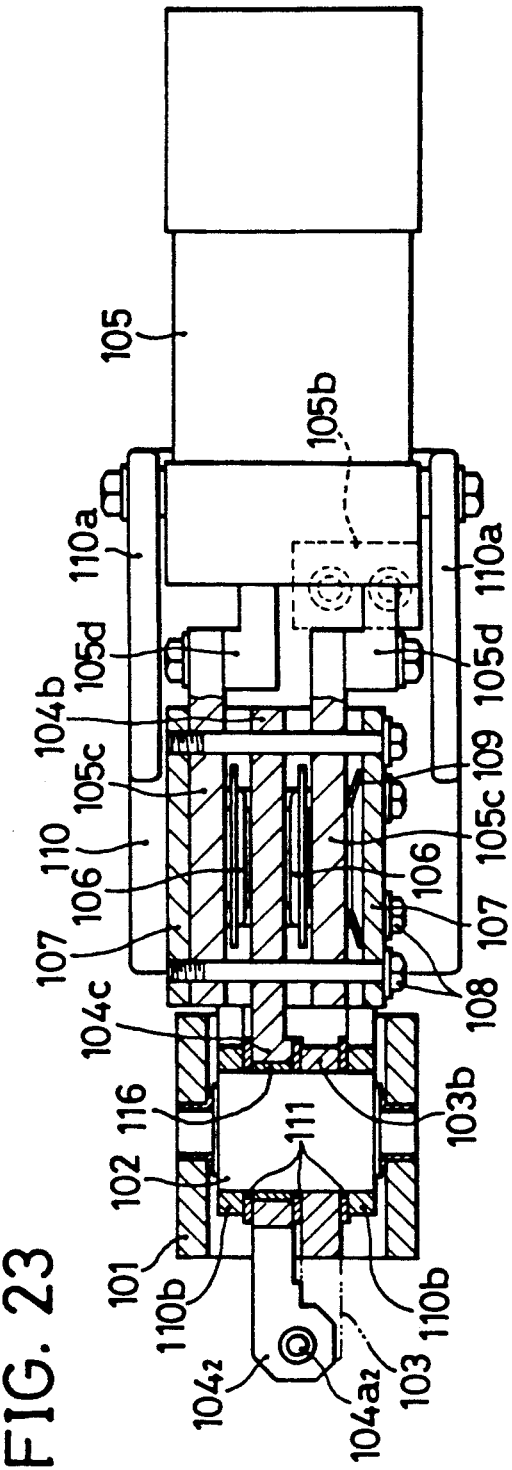
FIG. 19 is a bottom view thereof.
FIG. 23 is a sectional view taken along the line XXIII—XXIII in FIG. 21.
Figure 20:
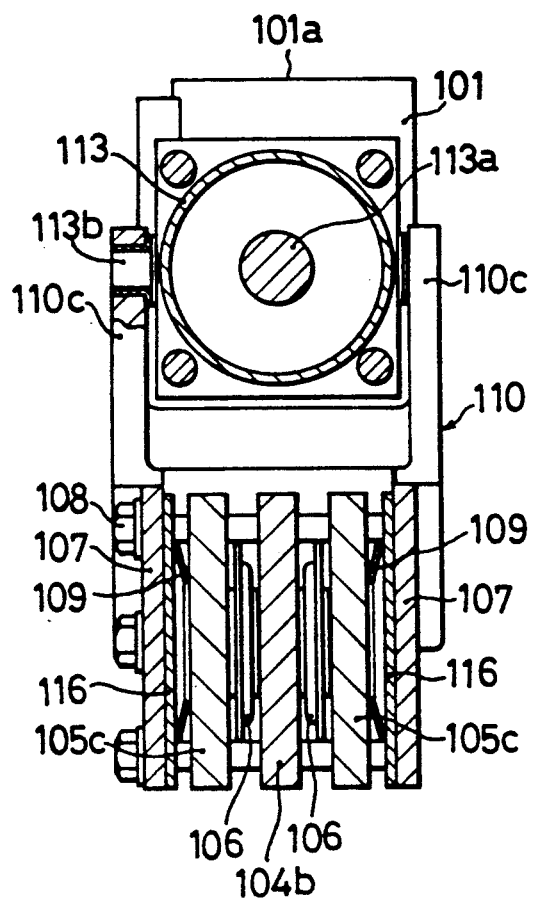
FIG. 20 is a sectional view taken along the line XX—XX in FIG. 18.
Figure 22:
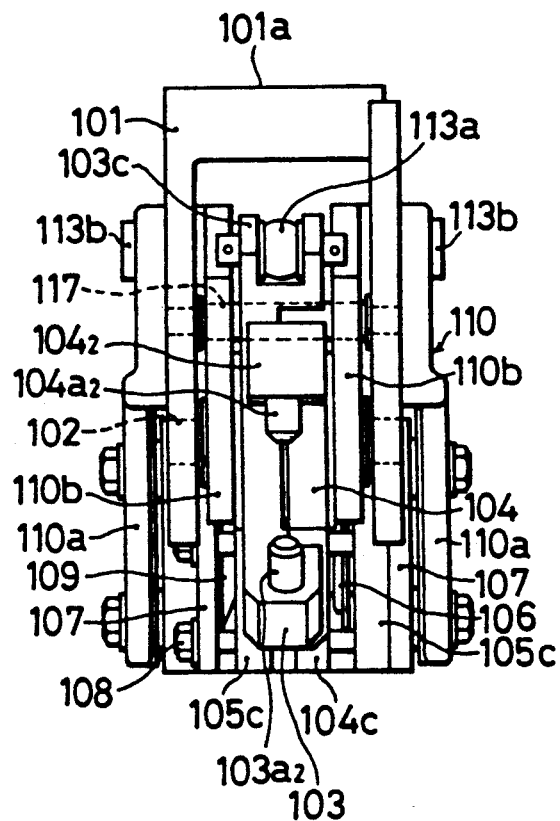
FIG. 22 is a front view thereof.

In the above-mentioned embodiment, the unit comprising the second gun arm 104 and the transformer 105 is arranged to be supported at the transformer 105 by the supporting arm 110. However, the construction needs not be limited to it. As shown in FIGS. 18 through 20, another embodiment may be employed. Namely, the holding plates 107, 107 for pressingly holding the terminal plates 105c, 105c of the transformer 105 may be formed integrally with the supporting arm 110. The unit is thus supported by the supporting arm 110 at a portion where the second gun arm 104 and the terminal plates 105c, 105c are pressingly held together. According to this arrangement, the holding plates 107, 107 and the supporting arm 110 are integrally formed to reduce the number of parts. In addition, in this embodiment, electrically insulating plates 116 are interposed, in addition to coned disc springs 109, between each of the holding plates 107 and each of the terminal plates 105c so that one of the holding plates 107 can be connected to the center tap 105b to supply electric power to the first gun arm 103.

Figure 21:
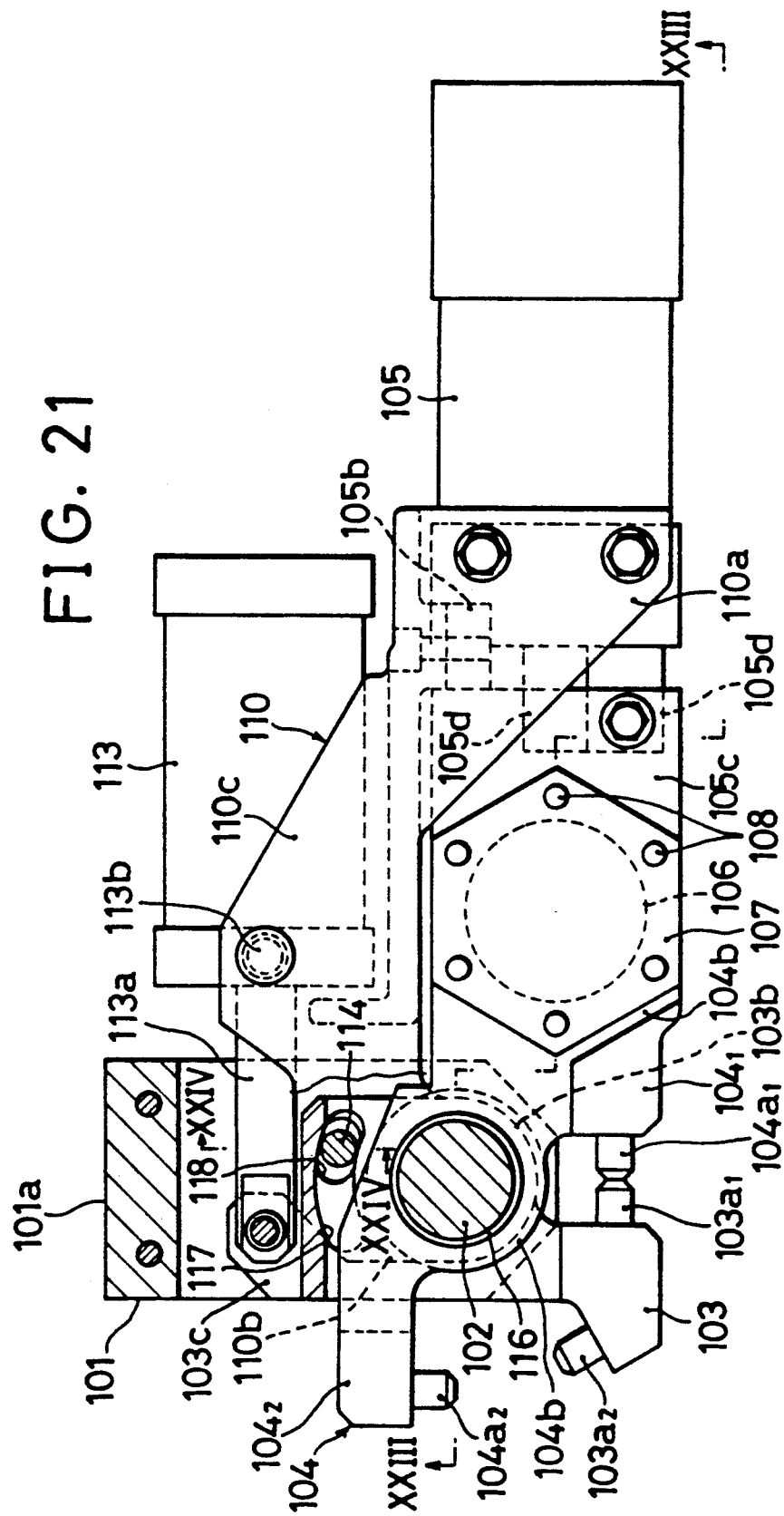
FIG. 21 is a side view, partly shown in section, of a double-headed X-shaped welding gun apparatus of this invention.

An embodiment shown in FIGS. 21 and downwards is a double-headed X-shaped welding gun apparatus of this invention. The same numerals are given to the same parts as those of the above-mentioned X-shaped welding gun apparatus.

In this embodiment, at a front end of the first gun arm 103 there are provided a pair of electrodes $103a_1$, $103a_2$ on one side and the other side, respectively, of the swinging direction of the first gun arm 103. The second gun arm 104 is provided with a two-piece-branched pair of arm portions $104_1$, $104_2$. An electrode $104a_1$ which opposes one $103a_1$ of the electrodes of the first gun arm 103 is provided on one $104_1$ of the arm portions, and another electrode $104a_2$ which opposes the other $103a_2$ of the electrodes of the first gun arm 103 is provided on the other $104_2$ of the arm portions. In this arrangement, when the first gun arm 103 is swung counterclockwise as shown in FIG. 21 by the extension of the pressurizing cylinder 113, the welding of a workpiece to be held between the electrodes $103a_1$, $104a_1$ is carried out. On the other hand, when the first gun arm 103 is swung clockwise by the contraction of the pressurizing cylinder 103, the welding of a workpiece to be held between the electrodes $103a_2$, $104a_2$ is carried out.

The first gun arm 103 and the second gun arm 104 are rotatably supported next to each other by the supporting shaft 102 at bearing blocks 103b, 104c which are provided at intermediate portions of the respective gun arms. The two-piece-branched bearing blocks 110b, 110b which are formed at a front end of the supporting arm 110 which support the transformer 105 and the pressurizing cylinder 113, are rotatably supported by the supporting shaft 102 in such a manner that they sandwich the bearing blocks 103b, 104c of both gun arms. The supporting arm 110 is, like in the above-mentioned embodiment, connected to the center tap 105 of the secondary coil of the transformer 105. The center tap 105b is electrically connected to the first gun arm 103 via the supporting arm 110 and the supporting shaft 102.

The second gun arm 104 is electrically insulated from the first gun arm 103 and the supporting arm 110 by means of washers 111 which are disposed on both sides of the bearing blocks 104c. The second gun arm 104 is also electrically insulated from the supporting shaft 102 by means of an insulating collar 116 which is disposed on an internal circumference of the bearing block 104c. The rear end portion 104b of the second gun arm 104 is pressingly held between the terminal plates 105c, 105c which are connected to both ends of the secondary coil, via the rectifiers 106, 106 in between. In this embodiment, the terminal plates 105c, 105c are detachably mounted to the taps 105d, 105d on both ends of the secondary coil.

Figure 24:
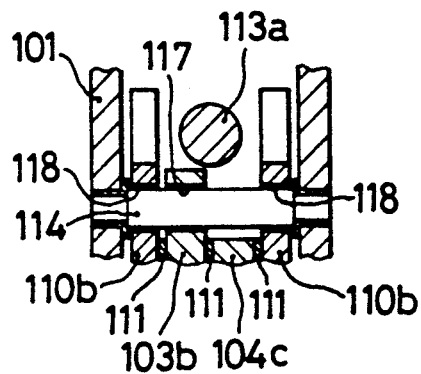
FIG. 24 is a sectional view taken along the line XXIV—XXIV in FIG. 21.

The gun bracket 101 is provided, as shown in FIG. 24, with a stopper pin 114 which is laterally disposed above the supporting shaft 102. An arcuate slot 117 for inserting the pin 114 is formed in the first gun arm 103 so that the first gun arm 103 can be swung without interference with the pin 114. On the other hand, a guide hole 118 is formed in the supporting arm 110 so as to restrict the swinging range of the supporting arm 110 in cooperation with the pin 114. In case the electrode $103a_1$ is fusingly adhered to the workpiece during welding with the workpiece being held between the electrodes $103a_1$, $104a_1$, an attempt is made to release the gun arms by supplying air to a left-side pressure chamber of the pressurizing cylinder 113. In such an operation, the pressurizing cylinder 113 is first moved to the left in FIG. 21, and the second gun arm 104 is swung counterclockwise in FIG. 21 via the supporting arm 110. When the arm portion $104_1$ has been opened by a predetermined opening degree, the right-side end of the guide hole 118 abuts the stopper pin 114. Thereafter, the piston rod 113a moves to the right with the pin 114 working as the reaction force receiving member. The electrode $103a_1$ is therefore forcibly detached from the workpiece, and the first gun arm 103 is opened clockwise. In case the electrode $103a_2$ is fusingly adhered to the workpiece during welding with the workpiece being held between the electrodes $103a_2$, $104a_2$, the second gun arm 104 is swung clockwise until the left-side end of the guide hole 118 abuts the stopper pin 114 at the time of opening the gun arms, and the electrode $103a_2$ is forcibly detached from the workpiece in the same manner as in the above-mentioned case.

In the above-mentioned embodiment the transformer 105 is disposed so as to be directly connected to the second gun arm 104. However, the transformer 105 may also be disposed so as to be directly connected to the first gun arm 103.

It is readily apparent that the above-mentioned apparatus has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A C-shaped welding gun apparatus comprising:
    a gun bracket;
    a pressurizing cylinder which is slidably supported on said gun bracket;
    a movable gun arm which is mounted on a piston rod which extends forwards from said pressurizing cylinder;
    a stationary gun arm which extends from a side of said pressurizing cylinder towards a front of said movable gun arm so as to lie opposite to a front portion of said movable gun arm; and
    a transformer which is provided on a rear side of said stationary gun arm, wherein:
    a center tap of a secondary coil of said transformer is connected to said movable gun arm through a flexible metal plate;
    a rear end portion of said stationary gun arm is inserted into a pair of terminal plates with a rectifier interposed respectively between said rear end portion and each of said terminal plates, said terminal plates being connected to both ends of said secondary coil of said transformer and being oppositely disposed in a widthwise direction of said transformer;

said both terminal plates are disposed such that a center line thereof is offset to one side of a widthwise center of said transformer;

said stationary gun arm is provided on one widthwise side of a front projected area of said transformer; and said flexible metal plate is provided, in parallel with said stationary gun arm, on the other side of said projected area.

2. A C-shaped welding gun apparatus according to claim 1, wherein: said both terminal plates are detachably mounted to taps on both ends of said secondary coil; an arm fixture for detachably mounting thereto said stationary gun arm is integrally formed in a front head cover of said pressurizing cylinder; and a transformer fixture for detachably mounting thereto said transformer is integrally formed in a rear head cover of said pressurizing cylinder.

3. A C-shaped welding gun apparatus according to claim 1, wherein: a pair of holding plates are provided on both oppositely external sides of said both terminal plates; a rear end portion of said stationary gun arm is pressingly fixed between said terminal plates by means of tightening bolts which extend across both of said holding plates; at least one of said holding plates on an outside of one of said terminal plates is electrically insulated from said one of said terminal plates; said center tap and said flexible metal plate are electrically connected to said one of said holding plates, whereby said holding plate is constituted to operate as a feeder relay member which connects said center tap and said ounce metal plate.

4. A C-shaped welding gun apparatus according to claim 3, wherein both of said holding plates are formed integrally with a head cover at a front end of said pressurizing cylinder.

5. A C-shaped welding gun apparatus according to any one of claims 1-4, wherein at least two pieces of a plurality of tie rods which are provided to extend between said head covers on both ends of said pressurizing cylinder are inserted through guide sleeves which are formed in said gun bracket, whereby said pressurizing cylinder is slidably supported on said gun bracket via said tie rods.

6. An X-shaped welding gun apparatus comprising:
a gun bracket;
a pair of gun arms which are opened and closed about a common supporting shaft which is provided in said gun bracket; and
a transformer, wherein:
one of said gun arms is directly connected to one of feeder terminals of said transformer to constitute a unit comprising said one of said gun arms and said transformer which are mechanically connected together;
a supporting arm which supports said unit is provided to rotatably support said one of said gun arms on said supporting shaft via said supporting arm; and
the other of said gun arms to be rotatably supported on said supporting shaft is electrically connected to the other of said feeder terminals of said transformer via said supporting arm.

7. An X-shaped welding gun apparatus according to claim 6, wherein a pressurizing cylinder is supported on said supporting arm substantially in parallel with said transformer and a piston rod of said pressurizing cylinder is connected to said other of said gun arms.

8. An X-shaped welding gun apparatus according to claim 6 or 7, wherein said other of said feeder terminals is constituted by a center tap of a secondary coil of said transformer, said one of said feeder terminals is constituted by a pair of terminal plates which are connected to both ends of said secondary coil and are disposed in opposite relationship to each other, and said unit is constituted by pressingly fixing said one of said gun arms between said terminal plates in such a condition that a rectifier is interposed respectively between said gun arm and each of said terminal plates.

9. An X-shaped welding gun apparatus according to claim 8, wherein said supporting arm is formed integrally with holding plates which hold said pair of terminal plates from oppositely external sides of said terminal plates.

10. A double-headed X-shaped welding gun apparatus comprising:
a gun bracket;
a pair of first and second gun arms which are rotatably supported by a supporting shaft which is provided in said gun bracket;
a transformer;
a pair of electrodes which are provided at a front end portion of said first gun arm in an opposite direction to each other;
a two-piece-branched pair of arm portions which are formed in said second gun arm;
an electrode which faces one of said electrodes of said first gun arm and is provided in one of said arm portions; and
an electrode which faces the other of said electrodes of said first gun arm and is provided in the other of said arm portions, wherein:
a supporting arm which is rotatably supported by said supporting shaft is provided;
said transformer is supported by said supporting arm;
one of said gun arms is directly connected to one of feeder terminals of said transformer; and
the other of said feeder terminals is electrically connected to said other of said gun arms via said supporting arm.

11. A double-headed X-shaped welding gun arm apparatus according to claim 10, wherein said pressurizing cylinder is supported on said supporting arm, and a piston rod of said pressurizing cylinder is connected to said other of said gun arms.

12. A double-headed X-shaped welding gun arm apparatus according to claim 10 or 11, wherein; said other of said feeder terminals is constituted by a center tap of a secondary coil of said transformer; said one of said feeding terminals is constituted by a pair of terminal plates which are connected to both ends of said secondary coil and are disposed opposite to each other; and said one of said gun arms is pressingly held between said both terminal plates in such a condition that a rectifier is respectively interposed between said one of said gun arms and each of said terminal plates.

13. A double-headed X-shaped welding gun arm apparatus according to claim 12, wherein said supporting arm is formed integrally with holding plates which hold said terminal plates from oppositely external sides of said both terminal plates.

* * * * *